United States Patent
Xiong et al.

(10) Patent No.: US 11,039,464 B2
(45) Date of Patent: Jun. 15, 2021

(54) SIMULTANEOUS HARQ-ACK FEEDBACK AND UPLINK TRANSMISSION WITHOUT DYNAMIC GRANT

(71) Applicant: APPLE INC., Cupertino, CA (US)

(72) Inventors: Gang Xiong, Portland, OR (US); Hong He, Sunnyvale, CA (US); Debdeep Chatterjee, San Jose, CA (US); Joonyoung Cho, Portland, OR (US); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 16/274,953

(22) Filed: Feb. 13, 2019

(65) Prior Publication Data

US 2019/0327755 A1    Oct. 24, 2019

Related U.S. Application Data

(60) Provisional application No. 62/631,317, filed on Feb. 15, 2018, provisional application No. 62/713,017, filed on Feb. 16, 2018.

(51) Int. Cl.
| | |
|---|---|
| *H04W 72/12* | (2009.01) |
| *H04L 5/00* | (2006.01) |
| *H04W 72/14* | (2009.01) |
| *H04W 76/27* | (2018.01) |

(52) U.S. Cl.
CPC ....... *H04W 72/1284* (2013.01); *H04L 5/0055* (2013.01); *H04W 72/14* (2013.01); *H04W 76/27* (2018.02)

(58) Field of Classification Search
CPC . H04W 72/12; H04W 72/14; H04W 72/1284; H04W 76/27; H04L 1/0026; H04L 1/0031; H04L 1/18; H04L 1/1861; H04L 1/1887; H04L 5/00; H04L 5/0046; H04L 5/0051; H04L 5/0055; H04L 5/0057
See application file for complete search history.

(56) References Cited

U.S. PATENT DOCUMENTS

| | | | |
|---|---|---|---|
| 10,512,072 B2 * | 12/2019 | Yi | H04L 5/0057 |
| 2019/0246395 A1 * | 8/2019 | Huang | H04L 5/0003 |
| 2019/0335488 A1 * | 10/2019 | Xiong | H04L 5/0055 |

(Continued)

*Primary Examiner* — Tri H Phan
(74) *Attorney, Agent, or Firm* — Fay Kaplun & Marcin, LLP

(57) ABSTRACT

An apparatus of a user equipment (UE) comprises one or more baseband processors to process payload size comprising a number of feedback bits for a hybrid automatic repeat request-acknowledgement (HARQ-ACK) configuration received from a New Radio (NR) NodeB (gNB) for physical uplink shared channel (PUSCH) transmission without grant, and to determine a size of reserved resource elements (REs) and mapping pattern in accordance with the configured HARQ-ACK payload size, and to transmit uplink shared channel on PUSCH without grant which is rate-matched around the reserved REs. The UE alternatively comprises one or more baseband processors to process a downlink control information (DCI) grant received from a to schedule a PUSCH transmission, wherein the one or more baseband processors are configured for dynamic DCI grant overwriting to process a dynamic indication to interrupt the scheduled PUSCH transmission.

18 Claims, 8 Drawing Sheets

(56) References Cited

U.S. PATENT DOCUMENTS

| | | | |
|---|---|---|---|
| 2020/0015251 A1* | 1/2020 | Takeda | H04W 72/1242 |
| 2020/0220703 A1* | 7/2020 | Kim | H04L 5/0051 |
| 2020/0236699 A1* | 7/2020 | Nakashima | H04L 27/26 |
| 2021/0014012 A1* | 1/2021 | Park | H04L 5/0055 |

* cited by examiner

SIMULTANEOUS HARQ-ACK FEEDBACK AND UPLINK TRANSMISSION WITHOUT DYNAMIC GRANT

CROSS-REFERENCE TO RELATED APPLICATIONS

The present application claims the benefit of U.S. Provisional Application No. 62/631,317 (AA8950-Z) filed Feb. 15, 2018 and U.S. Provisional Application 62/710,317 file Feb. 16, 2018. Said Application No. 62/631,317 and said Application No. 62/710,317 are hereby incorporated herein by reference in their entireties.

BACKGROUND

Mobile communication systems have evolved significantly from early voice systems to today's highly sophisticated integrated communication platforms. The next generation wireless communication system, Fifth Generation (5G) or new radio (NR) will provide access to information and sharing of data anywhere, anytime by various users and applications. NR is expected to be a unified network and/or system designed to meet vastly different and sometime conflicting performance dimensions and services. Such diverse multi-dimensional requirements are driven by different services and applications. In general, NR will evolve based on the Third Generation Partnership Project (3GPP) Long Term Evolution Advanced (LTE-A) standard with additional potential new Radio Access Technologies (RATs) to enrich lives with better, simpler, and more seamless wireless connectivity solutions. NR will enable everything to be connected by wireless technology to deliver fast and rich content and services.

The NR system use case families, enhanced Mobile Broadband (eMBB) and ultra-reliable and low latency communications (URLLC) have very different requirements in terms of user plane latency and required coverage levels. The key requirements allow for URLLC relate to U-plane latency and reliability. For URLLC the target for user plane latency should be 0.5 ms for UL, and 0.5 ms for DL. The target for reliability should be $1-10^{-5}$ within 1 ms.

For NR, grant free uplink transmission or uplink transmission without dynamic grant is supported. In particular, two types of grant free uplink transmission are specified. For Type 1 uplink transmission without grant, uplink (UL) data transmission without grant is only based on radio resource control (RRC) configuration or reconfiguration without any Layer 1 (L1) signaling. In particular, semi-static resource may be configured for one user equipment (UE) for grant free uplink transmission, which includes time and frequency resource, modulation and coding scheme, reference signal, etc. For Type 2 uplink transmission without grant, UL data transmission without grant is based on both radio resource control (RRC) configuration and L1 signaling to activate and/or deactivate UL data transmission, which is similar to semi-persistent scheduling (SPS) uplink transmission as defined in LTE. Further, in order to achieve high reliability for URLLC, the UE may be configured with K repetitions for a transport block (TB) transmission for grant free transmission.

For NR, uplink control information (UCI) can be multiplexed on physical uplink shared channel (PUSCH) for both grant-based and grant-free transmission. Further, for hybrid automatic repeat request-acknowledgement (HARQ-ACK) feedback on a physical uplink shared channel (PUSCH) and for slot-based scheduling, for HARQ-ACK with more than 2 bits, PUSCH is rate-matched, while for HARQ-ACK with up to 2 bits, PUSCH is punctured.

For non-fallback downlink control information (DCI) carrying uplink grant, downlink assignment index (DAI) is included to indicate the number of HARQ-ACK feedback bits, which ensures the alignment between the Fifth Generation NodeB (gNB) and the UE. For uplink transmission without grant, the DAI information is not available, which may lead to ambiguity on the number of HARQ-ACK feedback bits. In particular, when the UE miss-detects physical downlink control channel (PDCCH), the gNB and the UE may not have the same understanding on the number of HARQ-ACK feedback bits. In this case, when HARQ-ACK feedback is multiplexed on grant free PUSCH, gNB may not be able to decode the data correctly. Hence, certain mechanisms may be defined to ensure alignment between gNB and UE for HARQ-ACK on PUSCH without grant. As discussed herein, the terms "grant-free uplink transmission", "uplink transmission without dynamic grant", and "configured grant uplink transmission" are interchangeable.

It is expected that NR systems will support simultaneous operation of services with different latency and reliability requirements. For that purpose, downlink (DL) interrupted/preempted transmission indication by DCI format 2_1 was specified which tells UE which resource elements did not contain transmission to UE given that gNB changed scheduling decision during an ongoing physical downlink shared channel (PDSCH) transmission.

There is, however, no special support of dynamic multiplexing in UL from both intra-UE and inter-UE perspective. That is, if more urgent traffic appears at the UE for transmission, it may either collide with its own transmission or with another UE transmission within a cell unless some reserved resources are provisioned by the gNB.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimen-

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
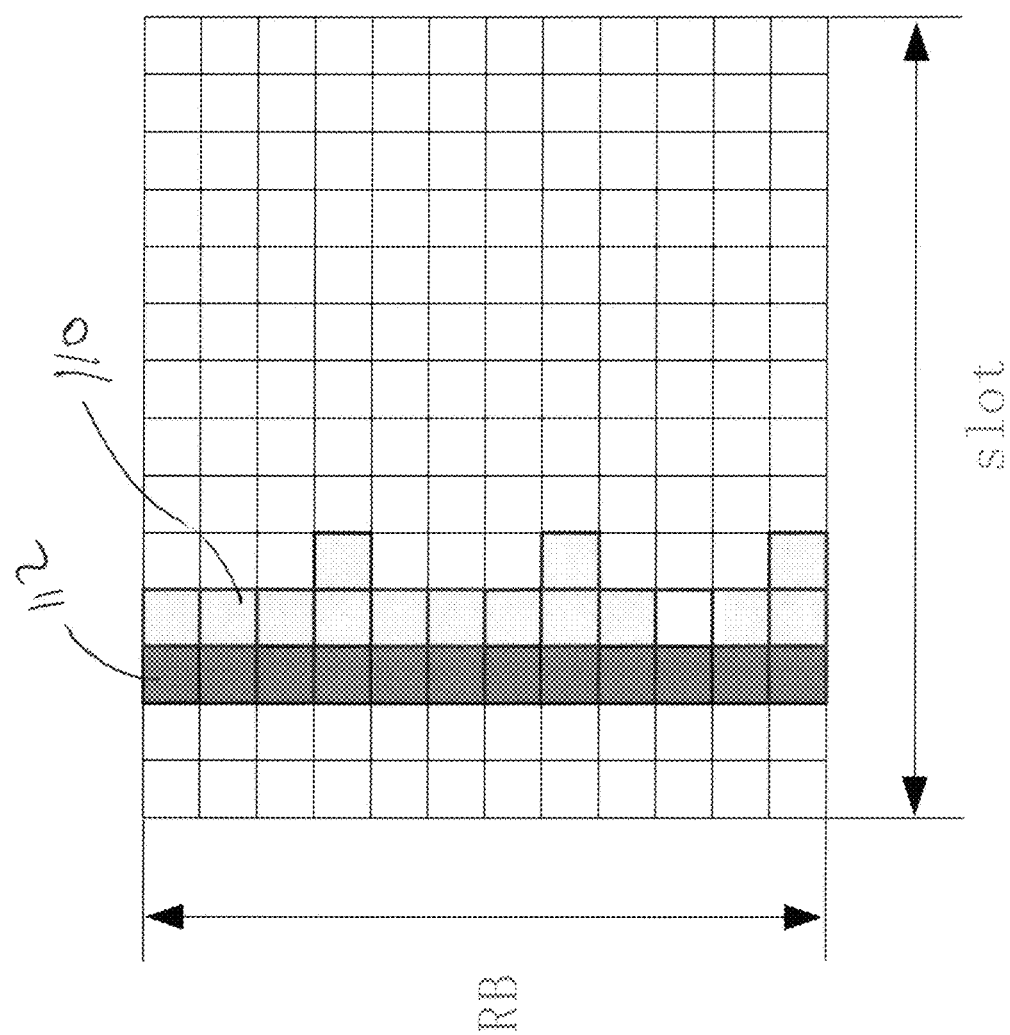
FIG. 1 is a diagram of reserved resource elements for HARQ-ACK on grant free PUSCH transmission in accordance with one or more embodiments.

Referring now to FIG. 1, a diagram of reserved resource elements for HARQ-ACK on grant free PUSCH transmission in accordance with one or more embodiments will be discussed. FIG. 1 illustrates one example of reserved REs 110 for hybrid automatic repeat request acknowledgment (HARQ-ACK) on grant-free physical uplink control channel (PUSCH) transmission. Other REs 112 contain demodulation reference symbols (DM-RS) symbols. Note that in case when the number of HARQ-ACK bits determined at UE is less than 2, the modulated HARQ-ACK symbols are mapped to a subset of the reserved REs 110. Locations of the reserved REs for HARQ-ACK are determined following the same rule defined for mapping modulated HARQ-ACK symbols to REs. Further, the actually transmitted HARQ-ACK symbols are mapped within the reserved REs 110 following the rule as defined for uplink control information (UCI) on PUSCH.

An uplink (UL) DAI may not be available for uplink transmission without grant, the gNB and the UE may not have same understanding of the number of HARQ-ACK feedback bits. In case when HARQ-ACK feedback bits are multiplexed on PUSCH without grant, the gNB may not be able to decode the data correctly. If PUSCH without grant is targeted for an ultra-reliable low-latency communication (URLLC) application, this would result in undesirable latency. Hence, certain mechanisms may be defined to ensure alignment between gNB and UE for HARQ-ACK on PUSCH without grant.

Embodiments of handling simultaneous HARQ-ACK feedback and uplink transmission without dynamic grant are provided as follows. In one embodiment, in case when physical uplink control channel (PUCCH) carrying HARQ-ACK feedback partially or fully collides with PUSCH without grant, the UE may only transmit one of PUCCH or PUSCH and drop another in accordance with a priority rule. The priority rule may depend on the service type or transmission duration of physical channels or which physical channel has earlier starting symbol.

In one option, in case when HARQ-ACK feedback is targeted for URLLC application, UE would drop PUSCH and transmit PUCCH carrying HARQ-ACK feedback only. Alternatively, in case when PUSCH without dynamic grant is targeted for URLLC application, UE may drop HARQ-ACK and only transmit PUSCH without dynamic grant.

In yet another option, the dropping rule or priority rule on whether PUCCH carrying HARQ-ACK feedback or PUSCH without grant is dropped can be configured by higher layers via radio resource control (RRC) signaling. This can be configured for both Type 1 and Type 2 grant free (GF) UL transmission, in UL-TWG-type1 or UL-TWG-type2 configurations, along with indication whether rate-matching or puncturing of HARQ-ACK on PUSCH is applied and/or the amount of reserved REs for HARQ-ACK on PUSCH without grant.

In another embodiment, for configured grant type 2, downlink control information (DCI) carrying activation of UL grant free transmission may include the UL DAI, which indicates the number of HARQ-ACK feedback bits. Note this UL DAI may apply for the initial transmission and/or subsequent transmission after initial transmission for Type 2 grant free uplink transmission.

In another embodiment, for configured grant type 1 and/or type 2, when HARQ-ACK feedback is multiplexed on PUSCH, some reserved resource elements (REs) for HARQ-ACK transmission may be defined. More specifically, the amount of the reserved REs for HARQ-ACK feedback on grant free PUSCH can be determined based on a payload size value, which can be predefined in the specification or configured by higher layers via NR minimum system information (MSI), NR remaining minimum system information (RMSI), NR other system information (OSI) or radio resource control (RRC) signaling.

Note that the reserved REs assuming configured number of HARQ-ACK feedback bits may apply for all Type 1 and Type 2 uplink transmission without grant. In another option, the reserved REs assuming configured number of HARQ-ACK feedback bits may apply for Type 1 uplink transmission without grant and Type 2 uplink transmission without grant which is not for initial transmission.

Alternatively, the assumed payload size value can be a combination of the value indicated by DAI, counter DAI and total DAI, in DCI carrying DL assignment in case of dynamic HARQ-ACK codebook or the value derived from semi-static HARQ-ACK codebook, and a predefined value, for example 2 or 4.

Further, the amount of resource allocated for reserved REs for HARQ-ACK transmission on grant free PUSCH can be determined based on the configured or indicated beta-offset. Note that beta offset indication may be included in the DCI for activation of Type 2 grant free uplink transmission.

The calculation of the amount of resource allocation for the reserved REs for HARQ-ACK can follow the formula defined for UCI on PUSCH.

In addition, locations of the reserved REs for HARQ-ACK are determined following the same rule defined for mapping modulated HARQ-ACK symbols to REs. Further, the actually transmitted HARQ-ACK symbols are mapped within the reserved REs following the rule as defined for UCI on PUSCH.

In another embodiment, regardless of the number of HARQ-ACK feedback bits, either puncturing or rate-matching is applied for the transmission of HARQ-ACK feedback on grant-free PUSCH. Whether to employ puncturing or rate-matching for HARQ-ACK feedback on grant-free PUSCH can be predefined in the specification or configured by higher layers via MSI, RMSI, OSI or RRC signaling. In an exemplary design, rate-matching can be always applied in case of carrying HARQ-ACK on grant-free PUSCH such that the PUSCH data, that is uplink shared channel (UL-SCH), is mapped around the punctured REs for HARQ-ACK, instead of puncturing the UL-SCH. This enables to avoid that the valid UL-SCH symbols are punctured and lost, especially, in cases that a very small size of UL data, for example transmission control protocol (TCP) ACK or Voice over Internet Protocol (VoIP) silence indicator, is carried on the PUSCH along with padding bits or beta-offset for the HARQ-ACK is large such as to consume a significant amount of REs where a small size of valid UL-SCH data is to be mapped on otherwise. Note that in case when the number of HARQ-ACK bits determined at UE is less than 2, the modulated HARQ-ACK symbols are mapped to a subset of the reserved REs.

Figure 2:
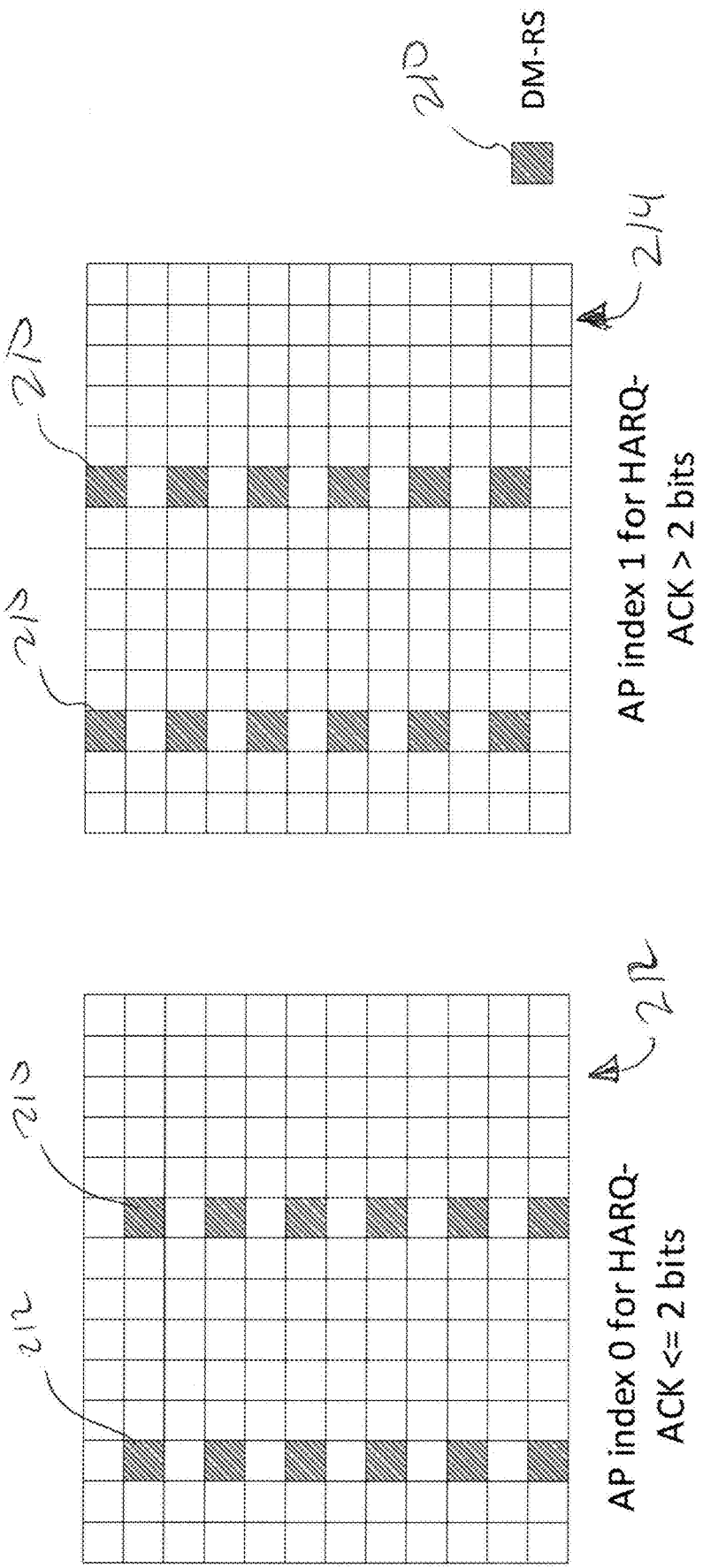
FIG. 2 is a diagram of a DM-RS AP index associated with the number of HARQ-ACK bits in accordance with one or more embodiments.

Referring now to FIG. 2, a diagram of a DM-RS AP index associated with the number of HARQ-ACK bits in accordance with one or more embodiments will be discussed. In the embodiment shown in FIG. 2, a DM-RS sequence index or an antenna port (AP) index used for PUSCH transmission without grant is associated with the determined number of HARQ-ACK feedback bits. In particular, the UE can be configured with K number (K>1) of DM-RS sequences 210 or APs, where K is predefined in the specification. After the UE determines the number of HARQ-ACK feedback bits, UE selects one of the DM-RS sequences or APs from the configured K DM-RS sequences or APs for DM-RS transmission in accordance with the determined number of HARQ-ACK feedback bits.

In addition, the association rule between the DM-RS sequence index or AP index and the number of HARQ-ACK bits can be predefined in the specification or configured by higher layers via MSI, RMSI, OSI or RRC signaling. In one option, one or more thresholds for HARQ-ACK feedback bits can be defined to determine the DM-RS sequence 210 or AP index. The rule to determine the DM-RS sequence or AP index is given as follows.

$$\begin{cases} 0 < N_{HARQ-ACK} \leq N_{thres,0} & DM\text{-}RS\ AP\ 0 \\ N_{thres,0} < N_{HARQ-ACK} \leq N_{thres,1} & DM\text{-}RS\ AP\ 1 \\ \quad\cdots & \cdots \\ N_{thres,K-2} < N_{HARQ-ACK} & DM\text{-}RS\ AP\ K\text{-}1 \end{cases}$$

Where $N_{HARQ-ACK}$ is the number of HARQ-ACK feedback bits; $N_{thres,k}$ (k=0, ..., K-2) are the thresholds, which can be predefined in the specification or configured by higher layers via MSI, RMSI, OSI or RRC signaling.

In one example, the UE is configured with two DM-RS APs. DM-RS AP 0 is selected when the number of HARQ-ACK bits is less than 3, while DM-RS AP 1 is selected when the number of HARQ-ACK bits is greater than 2.

In yet another option, the following rule can be used to determine the DM-RS sequence or AP index:

$$\begin{cases} N_{HARQ-ACK} \bmod K = 0 & DM\text{-}RS\ AP\ 0 \\ N_{HARQ-ACK} \bmod K = 1 & DM\text{-}RS\ AP\ 1 \\ \quad\cdots & \cdots \\ N_{HARQ-ACK} \bmod K = K-1 & DM\text{-}RS\ AP\ K\text{-}1 \end{cases}$$

In one example, the UE is configured with two DM-RS APs. DM-RS AP0 is selected for even number of HARQ-ACK bits, while DM-RS AP 1 is selected for odd number of HARQ-ACK bits. The embodiment shown in FIG. 2 illustrates one example of DM-RS AP index associated with the number of HARQ-ACK bits. In particular, DM-RS AP 0 shown at 212 is selected when the number of HARQ-ACK bits is less than 3, while DM-RS AP 1 is selected when the number of HARQ-ACK bits is greater than 2.

Figure 3:
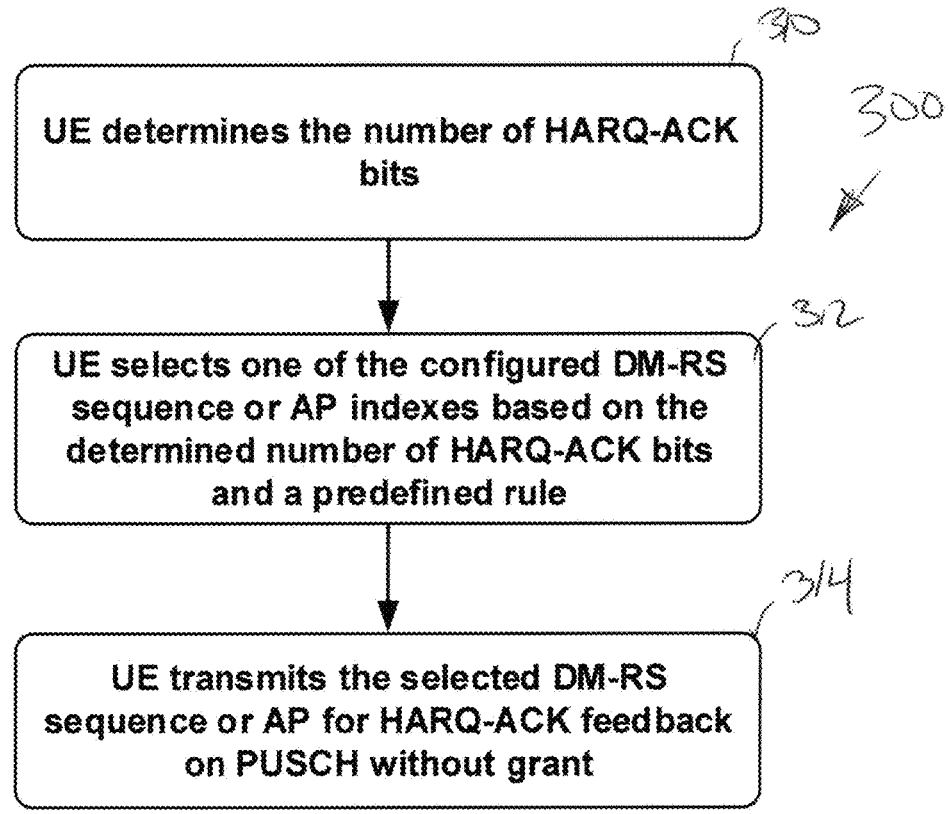
FIG. 3 is a flow diagram of a procedure to determine the DM-RS sequence or AP index in accordance with one or more embodiments.

Referring now to FIG. 3, a flow diagram of a procedure to determine the DM-RS sequence or AP index in accordance with one or more embodiments will be discussed. In particular, FIG. 3 shows the procedure 300 to determine the DM-RS sequence or AP index for HARQ-ACK feedback on PUSCH without grant. At block 310, the UE determines the number of HARQ-ACK bits. At block 312, the UE selects on of the configured DM-RS sequence or AP indexes based on the determined number of HARQ-ACK bits and a predefined rule. At block 314, the UE transmits the selected DM-RS sequence or AP index for HARQ-ACK feedback on PUSCH without grant. It should be noted that the selected APs may apply for the APs for both DM-RS and PUSCH transmission.

In some embodiments discussed herein, the issue of dynamic multiplexing of UL transmissions with different latency and reliability requirements within a UE and among different UEs is addressed. Such embodiments are directed to intra-UE multiplexing including dynamic DCI overwriting, and inter-UE multiplexing including dynamic scheduling enhancements, interrupted transmission indication, and continuation transmission indication.

For intra-UE multiplexing embodiments, different services can be multiplexed within one UE. If services with different latency and reliability requirements are active at the UE simultaneously, then collisions are possible due to different timescales of operation. For example, a grant-free transmission or grant-based transmission of URLLC traffic may be triggered at a UE during an ongoing eMBB transmission.

It is natural to assume that UE can prioritize transmission of the service which has higher priority. In case of grant-based access, the grant which is associated with the higher priority service should be assumed to take precedence of the lower priority schedules.

Although there is a media access control (MAC) layer procedure for logical channel filtering to be mapped to a given PUSCH, handling of such collisions is expected to be performed at L1. For that purpose, some rules for PUSCH dropping in case of overlap should be defined.

Implicit prioritization criteria may be provided to address the situation wherein there is no notion of PUSCH or DCI grant priorities. In one embodiment, prioritization by physical downlink control channel (PDCCH) monitoring instance, for example the last symbol of PDCCH where DCI was detected, or duration of transmission indicated by corresponding PDCCHs carrying DCI may be defined. In this case, the overlapping PUSCH scheduled by PDCCH detected later than another grant is expected to be prioritized since the gNB decision is assumed to take such collision into account.

If an overlap happens and collision is handled by the proposed above prioritization rule, it is expected that the UE drops at least the lower priority PUSCH part overlapped in time domain with the higher priority PUSCH, that is no power sharing is allowed in case of non-overlapping in frequency domain allocations. If the UE detects preempting DCI which schedules PUSCH that starts before or together with the previously scheduled PUSCH it is expected that the previously scheduled PUSCH is cancelled. If the preempting DCI schedules the same HARQ process or another HARQ process and if PUSCH repetitions are configured, the repetitions are also dropped. Alternatively, if DCI schedules another HARQ process the repetitions may not be dropped if do not experience any other overlap in time domain. If the UE detects preempting DCI which schedules the higher priority PUSCH during an ongoing PUSCH transmission it should not be expected that UE continues transmission of the lower priority PUSCH after dropping the overlapped part.

Alternatively, a UE only drops overlapping in time symbol of the previously scheduled PUSCH. In this case, a minimum granularity of such interruption may be defined. For example, a granularity of X symbols interruption intervals could be defined in order to accommodate UE transient times, for example X=2 symbols could be defined. The minimum granularity may also be a function of subcarrier spacing wherein the higher subcarrier spacings may require more symbol than the lower subcarriers spacings. It should be noted that dropping here may either be referred to puncturing or rate-matching. A baseline assumption is puncturing which does not affect UE baseband processing. With large K2 values, the time between grant reception and PUSCH transmission, however, it may be possible that the UE may perform rate-matching instead of puncturing. The rate-matching may also be subject to UE processing capabilities and may be semi-statically configurable by UE-specific radio resource control (RRC) signaling.

For this approach, a UE is not expected to receive two DCI grants scheduling overlapping PUSCH in the same time instance, that is in the same control resource set (CORESET) monitoring occasion or in different CORESETs with overlapping monitoring occasions in time-domain with the same last symbol of the CORESETs. Furthermore, similar rules could be defined for other UE transmissions, that is uplink control information (UCI), physical uplink control channel (PUCCH), physical random access channel (PRACH) and sounding reference signal (SRS). In an embodiment, it may be specified that a dynamically triggered UE transmission indicating transmission on resources that overlap in time with another UL transmission has higher priority than the previously dynamically or semi-statically triggered transmission regardless whether this is a PUSCH scheduled by a dynamic grant or UCI/PUCCH, PRACH or SRS scheduled by dynamic downlink control information (DCI).

The discussed rules may or may not be applied by a UE subject to its capabilities and RRC configuration. In one embodiment, a UE may be semi-statically configured, subject to capabilities, by a UE-specific RRC signaling with a higher layer parameter which enables or disables the mechanism of over-writing one dynamic scheduling by another dynamic scheduling of UL transmission.

Figure 4:
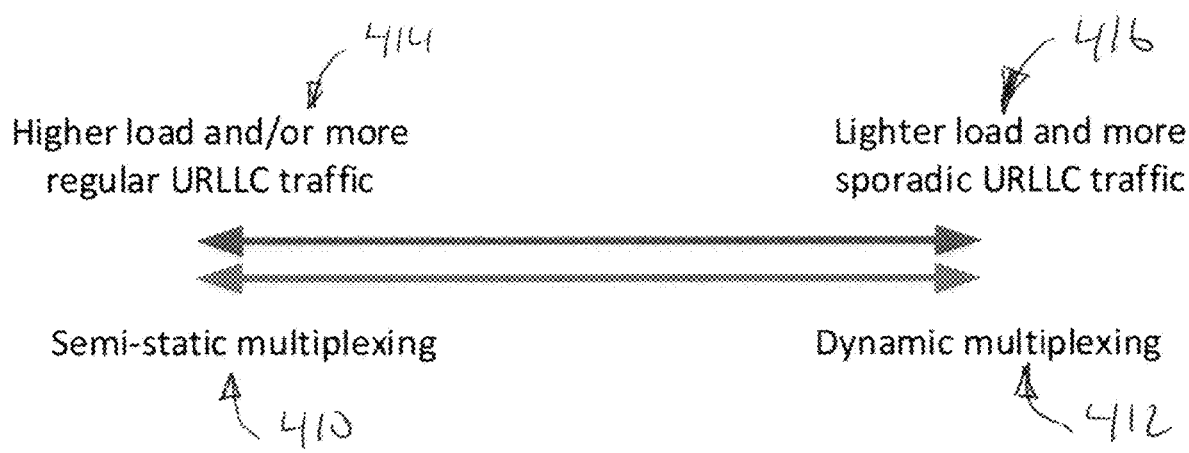
FIG. 4 is a diagram of the relationship of URLLC traffic characteristics and multiplexing approaches in accordance with one or more embodiments.

Referring now to FIG. 4, a diagram of the relationship of URLLC traffic characteristics and multiplexing approaches in accordance with one or more embodiments will be discussed. For inter-UE multiplexing, mechanisms of an uplink (UL) ultra-reliable low-latency communication (URLLC) and enhanced mobile broadband (eMBB) multiplexing for different UEs in a cell are provided. In general, the UL URLLC and eMBB transmissions can be multiplexed in time or frequency using the same or different numerologies at the same carrier. Depending on URLLC service load and traffic characteristics, the multiplexing approach could be either semi-static multiplexing 410 or dynamic multiplexing 412, or a combination thereof as shown in FIG. 4. In case of the high URLLC traffic loading and/or regular traffic pattern for URLLC as shown at 414, the semi-static multiplexing strategy may properly work without capacity penalty. The semi-static multiplexing 410 approach may be realized by gNB implementation with restrictive scheduling of eMBB UEs outside of URLLC resources. When the traffic is sporadic/irregular and has low rate, however, as shown at 416, reservation of resources for URLLC reception may lead to substantial eMBB capacity penalty. For example, if URLLC service sporadically appears in average once in a second and consumes 1 ms and 10% of bandwidth, the overall reserved spectrum resource usage will be about 0.1% with 9.999% of overall spectrum wasted. In this case, mechanisms of dynamic multiplexing 412 would provide substantial eMBB performance gains. Embodiments that can serve the dynamic multiplexing purpose include dynamic scheduling by short transmissions of both eMBB and URLLC, and UL transmission interruption or continuation indication.

For dynamic scheduling, the problem of multiplexing may be completely resolved by dynamic scheduling if eMBB is also scheduled by short transmissions, for example mini-slots. Such scheduling, however, implies higher monitoring rate by a UE if regular approach of dynamic grant is used, that is every transmission time interval (TTI) is scheduled by a DCI grant carried by PDCCH. This approach also has high overhead for control and DM-RS as well as MAC layer headers. Moreover, such UE transmission would have limited coverage or transmission block size (TBS) restrictions due to short transmissions and correspondingly lower emitted energy.

For a more efficient dynamic scheduling of short eMBB transmissions, techniques to reduce system overhead and PDCCH monitoring burden at a UE may be further studied. One example is to share DM-RS between mini-slots in case of PUSCH mapping Type B which are currently present at least in the first symbol of each PUSCH transmission Type B. In another approach, PUSCH scheduling may be organized by two types of DCI: first regular one is to trigger multiple short transmissions while the second one is to schedule PUSCH parts during the slots. The second DCI may not even carry any transmission parameters rather to allow UE to replicate the previous scheduling grant.

In one embodiment, a UE may be scheduled by a two-phase DCI. First, a UE detects regular PDCCH with configured, for example slot-level, monitoring periodicity for PUSCH scheduling, wherein a first PDCCH may be scrambled by a UE specific radio network temporary identifier (RNTI), for example cell radio network temporary identifier (C-RNTI) or a group common RNTI, which can be predefined in the specification or configured by higher layers. This first PDCCH schedules the PUSCH with a limited time-duration, that is, PUSCH with a relatively small number of symbols.

Second, if the UE detected the first PDCCH it can trigger monitoring of another "secondary" DCI format with the following properties. The secondary DCI format may have smaller size where most of the dynamic scheduling parameters are assumed as same as those indicated by the primary DCI. CORESET and monitoring periodicity for the secondary DCI may be configured separately. The decoding candidate for monitoring of this DCI is directly derived from the candidate where the primary DCI was detected, or this DCI is monitored by substantially reduced number of candidates. Common search space or UE specific search space may be used for the secondary DCI. The secondary DCI format may be scrambled by group-common RNTI, which may be configured by higher layers. The above described example procedure does not achieve lower latency for eMBB since PUSCH is triggered by a regular PDCCH, but it aims to minimize overhead of scheduling UE by short transmissions after the triggering.

Figure 5:
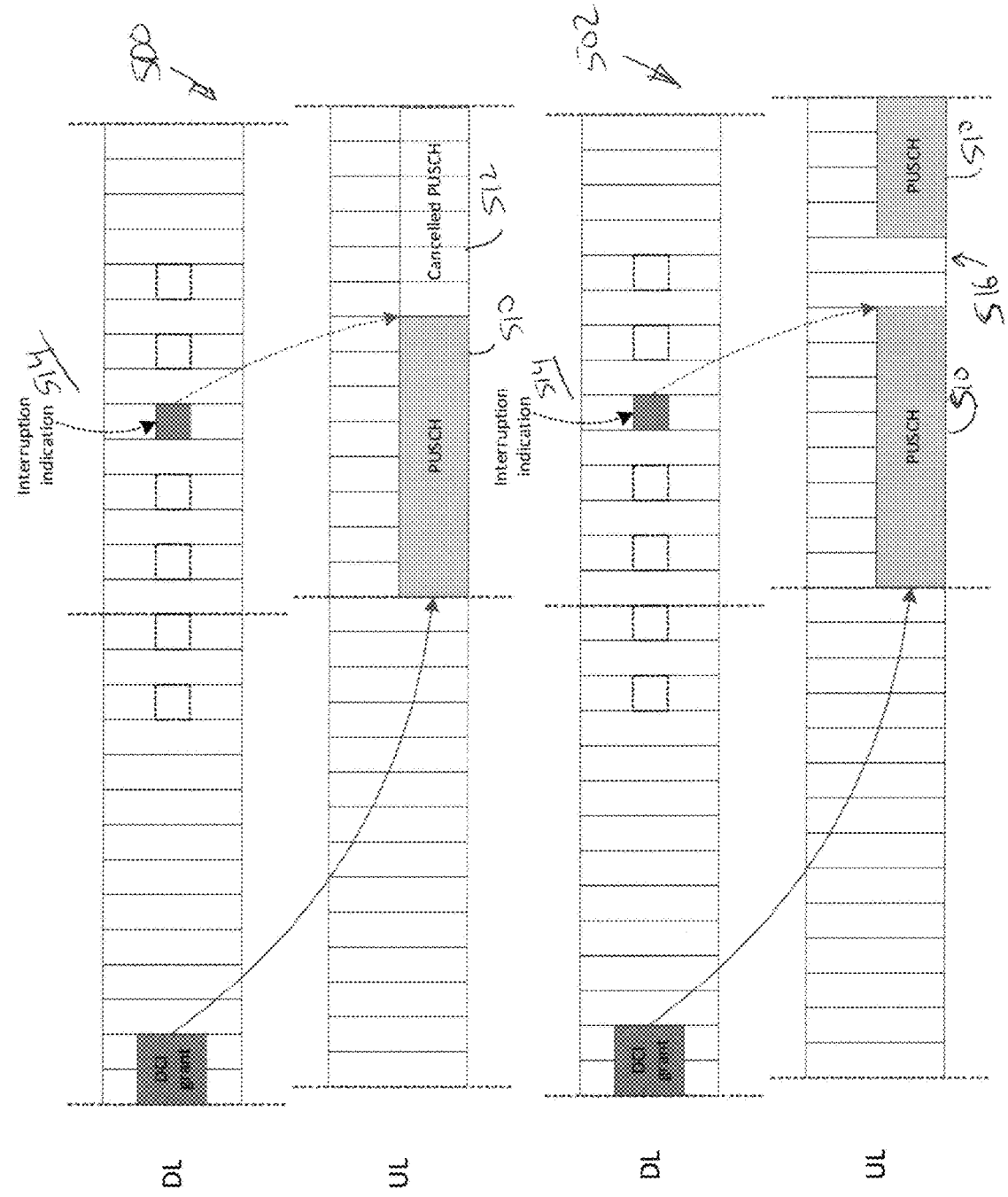
FIG. 5 is a diagram of uplink interruption indication in accordance with one or more embodiments.

Referring now to FIG. 5, a diagram of uplink interruption indication in accordance with one or more embodiments will be discussed. Additional benefits could be observed if long transmissions may be interrupted or stopped to yield to ultra-reliable low-latency communication (URLLC) services. Two general types of such indication include interruption indication (U-INT) and continuation indication (U-CON).

For interruption indication, the following potential candidates for realizing UL interruption indication (U-INT) are considered. A first option is directed to Reuse of DL interruption/preemption indication format. In this embodiment, the already defined DCI format 2_1 may be reused but scrambled with different RNTI. It can at least be size-matched to the DCI format 2_1 monitored by INT-RNTI in order to save decoding candidates if monitoring occasions overlap. Content of the DCI for U-INT may be similar, that is bitmap pointing to a Reference Uplink Resource (RUR). In case of UL, the granularity in frequency domain may need to be much finer than in DL where whole BWP or half BWP is used since UL transmissions are subject to power limitation and therefore are likely to be narrower than in DL.

The reference UL resource needs to be defined for future time instance relative to the time instance of DCI detection. It may not even have "right" boundary, that is interruption is active until another scheduling grant received corresponding to the frequency domain resources indicated by the RUR. The time offset between DCI detection and RUR should at least accommodate application time which may be tentatively assumed to be limited by N2 value similar to slot format indicator (SFI) application time. The application time may also be configured semi-statically by RRC signaling, which may depend on UE capability. Note that in time domain, DL symbols and/or flexible symbols configured by semi-static DL/UL assignment may not be included in the RUR when using bitmap to indicate the pre-emption resource in time. In another example, only DL symbols configured by semi-static UL-DL-configuration or symbols indicated already for DL transmissions, via dynamic scheduling, may be assumed as not included in the RUR when using bitmap to indicate the interrupted resources in time domain.

Frequency domain span of RUR should at least cover UE active uplink BWP. However, since the pair of DL+UL bandwidth parts is UE-specifically configured, although UEs may monitor the same DL bandwidth part (BWP), they may have different UL bandwidth parts. In that sense, U-INT may better utilize similar approach as DL interruption indication for the case of cross-carrier scheduling. For example, the group common DCI for U-INT may have N identical signaled parts wherein each UE is configured with an index of the part to read in the DCI. This mechanism may be generalized to cross-carrier and cross-BWP scheduling. Further, in frequency domain, the granularity indicated by INT indication can be predefined in the specification, or configured by higher layers or fixed as a function of UL BWP. In one example, this can be UL BWP/K, wherein K is a fixed value. Alternatively, K can be defined as a function of the UL BWP size, for instance, it could be a function of the configured RBG size for the UL BWP or it could be a function of the RBG size corresponding to RBG Configuration 2 table. The latter may be helpful if RBG Configuration 2 table is specified mainly considering URLLC use cases.

U-INT indication may be combined with DL interruption indication DCI. In this case, UE may monitor the same INT-RNTI with a given size but be configured with a mapping of DCI bits to particular DL carriers and UL bandwidth parts plus carriers. As a further extension, INT indication may be configured with different monitoring occasions, e.g. different offsets/periodicities to indicate whether D-INT and U-INT is carried by DCI format 2_1.

In another option, a single DCI format can be used to carry both D-INT and U-INT indication. More specifically, the first part of DCI field may be used to carry D-INT and the second of DCI field may be used to carry U-INT. The size of the DCI format may be configured by higher layers via NR remaining minimum system information (RMSI), NR other system information (OSI) or radio resource control (RRC) signaling. In addition, this DCI format may be size-matched with other DCI formats.

A second option is directed to slot format indicator (SFI) based interruption. Dynamic slot-format indication (SFI) carried by DCI format 2_0 may be used to cancel the already scheduled dynamic or semi-static UL transmission. For that purpose, the symbols being interrupted can be marked as unknown and UE could be configured to cancel all UL transmissions which overlap with these symbols. However, SFI is not much suitable for such purposes and was designed mainly to provide dynamic change of transmission directions. In that sense, SFI may only be used as a complimentary solution to a dedicated indication.

A third option is directed to multiplexing and/or piggybacking on DL resources. If the UE operates in both DL and UL simultaneously, U-INT can be signaled as part of PDSCH or PDCCH for this UE. Such mechanism may be considered similar to the UL piggybacking of UCI on PUSCH. One example is to multiplex new sequence or use DM-RS or PT-RS/T-RS/CSI-RS. In particular, a relatively sparse-in-frequency domain CSI-RS configuration may be configured for a UE or a group of UEs. Either presence detection or sequence detection may be used to identify UL interruption.

A fourth option is directed to UE-specific DCI signaling. A similar mechanism as discussed for intra-UE multiplexing can be used. For that purpose, a gNB may signal a dynamic grant with invalid resource allocation that may be interpreted by a UE as "no transmission" scheduling, that is an interruption. At least frequency allocation may be set to a reserved value while the time allocation may still indicate which symbols of PUSCH should be stopped. In a generalized case, this could be even just a valid DCI which changes UE allocation so that it does not interfere another transmission.

In another option, multi-mini-slot or multi-slot based UL transmission with and/or without grant can be used for PUSCH transmission. In particular, a first DCI to trigger the PUSCH spanning multiple mini-slots or slots may be employed, which can help to reduce signaling overhead. Further, a second DCI or other methods as mentioned above to stop or interrupt multi-mini-slot or multi-slot based UL transmission can be applied.

The U-INT application timeline is illustrated in FIG. 5. FIG. 5 on the top part 500 shows the case when the UE cancels the entire remaining part 512 of a PUSCH transmission 510 based on an interruption indication 514. FIG. 5 on the bottom part 502 shows the case when the UE cancels only the transmission on the symbols 516 indicated via the interruption indication. Such cancellation can be defined based on puncturing or rate-matching to avoid the indicated resources. Here, "puncturing" implies that the modulated symbols are mapped to the resource elements but not transmitted. Note that although the embodiments as herein described are directed to PUSCH transmission, however they are applicable for other UL physical channels and signals as well, and the scope of the claimed subject matter is not limited in this respect.

In general, for UL transmissions when using repetitions (PUSCH, PUCCH, SRS, or PRACH), the UE may only cancel transmission on the particular repetitions that correspond to resources within the RUR that are indicated as being interrupted, while the other repetitions may still be transmitted.

In an embodiment, the interruption indication may not apply to PUCCH transmissions. In another embodiment, the interruption indication may not apply to PUCCH transmissions carrying HARQ-ACK feedback. Thus, even if such resources fall within an RUR and the U-INT indicates no transmission on such resources, a UE expected to transmit HARQ-ACK on PUCCH may continue its transmission as originally indicated. In another embodiment, in case a UE is expected to transmit HARQ-ACK on PUSCH due to overlap of PUCCH and PUSCH resources in time domain, and the PUSCH transmission is interrupted or cancelled, the UE transmits the HARQ-ACK feedback instead on the PUCCH resources indicated via the DCI scheduling the corresponding PDSCH.

Figure 6:
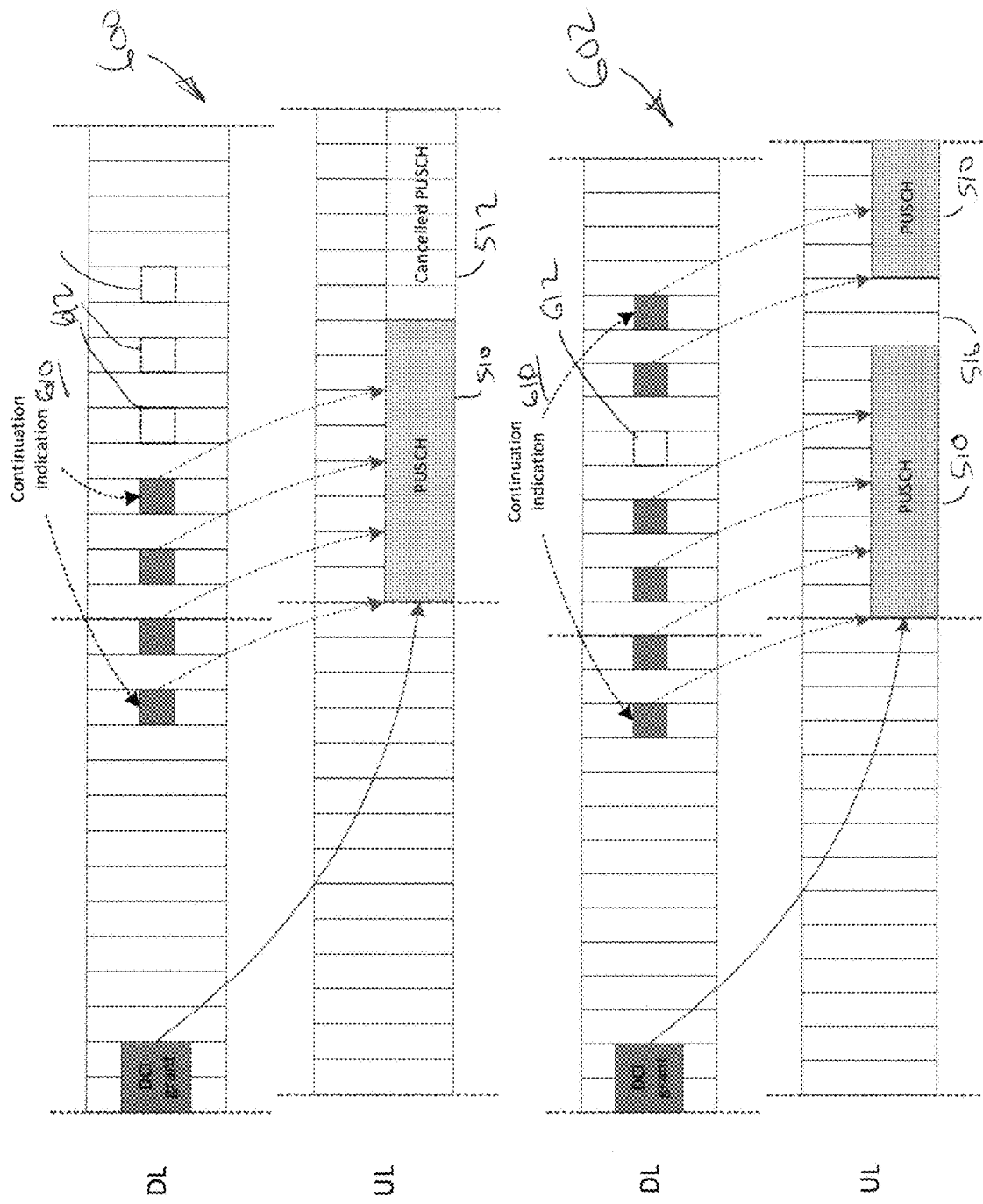
FIG. 6 is a diagram of uplink continuation indication in accordance with one or more embodiments.

Referring now to FIG. 6, a diagram of uplink continuation indication in accordance with one or more embodiments will be discussed. The continuation indication (U-CON) approach is very similar to the interruption indication approach as shown in FIG. 5 but delivers to UEs information that the scheduled transmission must or must not be continued as planned. In this approach, a continuation indication 610 should be received for the UE to continue with a PUSCH, otherwise the remaining portion 512 may be cancelled in the absence 612 of one or more continuation indications as shown in the top portion 600 of FIG. 6. Alternatively, as shown in the bottom portion 602 of FIG. 6, and absence 612 of one or more continuation indications 610 can result in one or cancellation of one or more symbols 516 of the PUSCH. This approach may be viewed as a part of dynamic scheduling, but without full-blown DCI used to schedule every part of PUSCH. The UE may be configured to monitor for U-CON according to a configured monitoring periodicity within a time window that spans the originally intended, dynamically or semi-statically scheduled, UL transmission. Further, such monitoring may be activated only if the complete UL transmission spans a number of symbols exceed some pre-defined threshold in absolute time or number of symbols corresponding to a given numerology). A utility of such indication is that in case of missed detection it cannot lead to URLLC service degradation, while missing interruption indication may lead to strong interference to URLLC transmissions. Comparing to U-INT, U-CON typically consumes more monitoring occasions but smaller resources for each indication since it should not be delivered with ultra-reliability. Continuation indication transport options are identical to the ones listed for U-INT, that is it can either be based on DL interrupted transmission indication format, or other group-common or UE-specific indication.

It should be noted that the continuation and interruption indications may be applied in different situations. For example, U-INT is most beneficial when URLLC service is rare and therefore, there will be no overhead caused by U-INT when no URLLC service is active. However, when URLLC traffic is moderate but still sporadic, U-CON may provide near the same signaling overhead but ensuring URLLC service is protected even if the indication is missed by UEs.

In another embodiment, U-INT/U-CON could be applicable only for UL transmissions with repetitions and not applicable to UL transmissions without any repetitions or they could be applicable only for UL transmissions spanning a certain number of minimum duration or number of symbols for a given subcarrier spacing. Further, for the case of U-INT, a UE is expected to monitor for U-INT only when configured for PUSCH transmissions with aggregation factor >1 for PUSCH dynamically scheduled or with configured grant transmissions.

Figure 7:
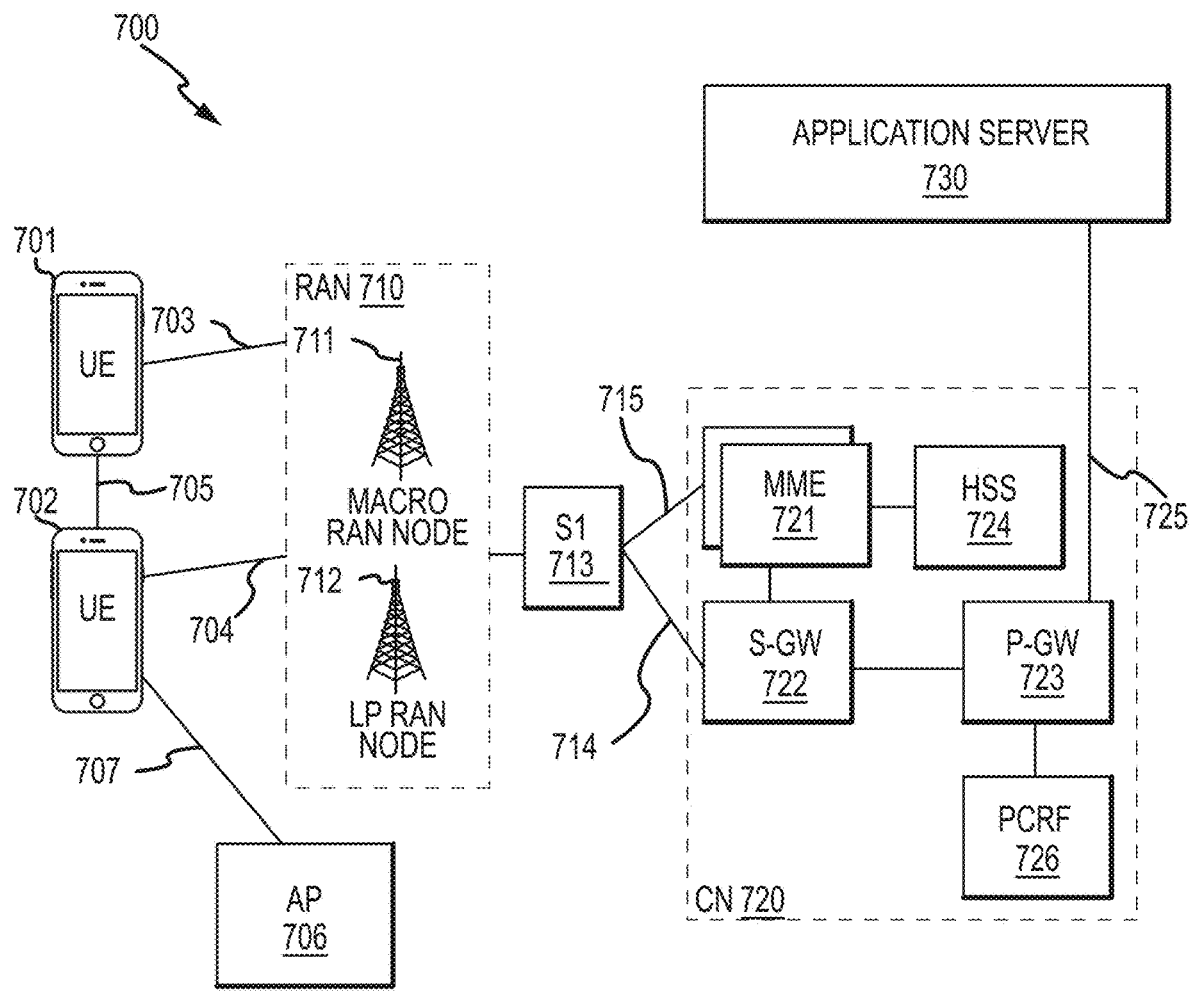
FIG. 7 illustrates an architecture of a system of a network in accordance with some embodiments.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.11 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
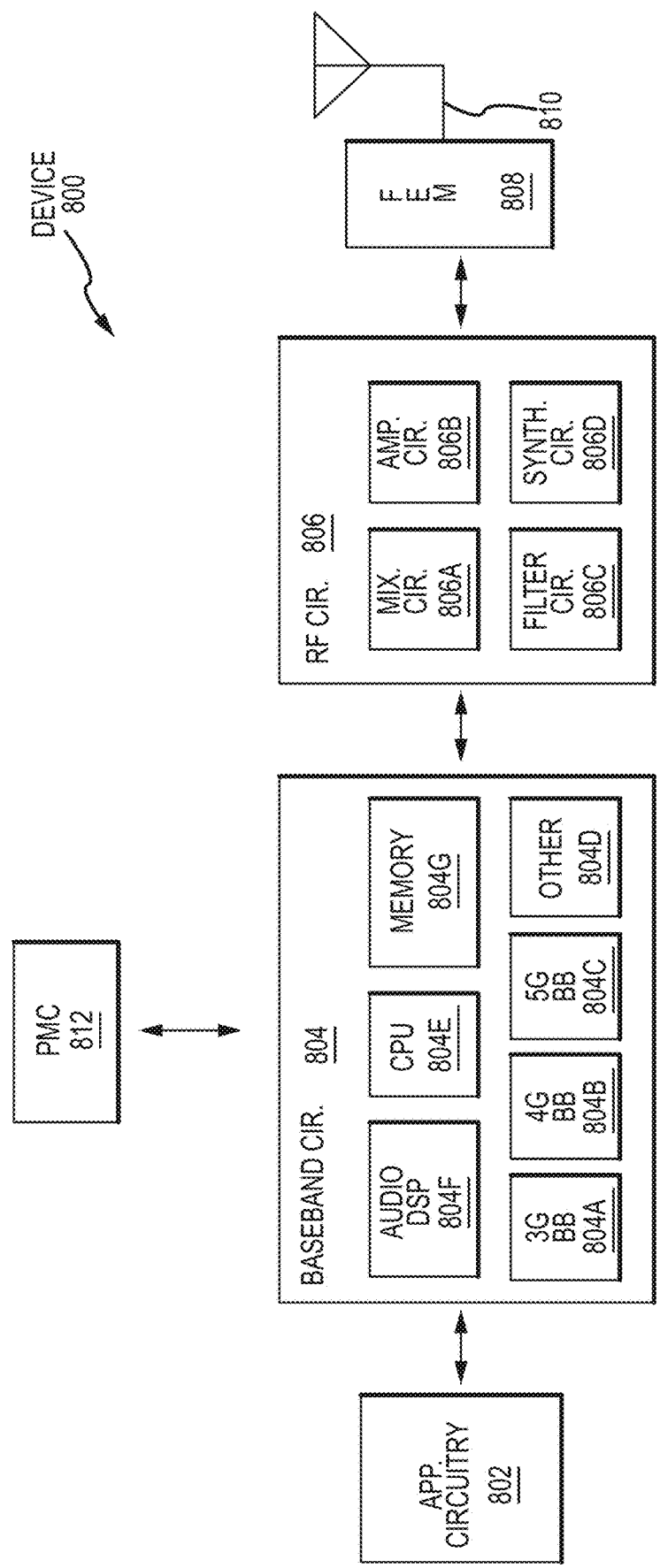
FIG. 8 illustrates example components of a device in accordance with some embodiments.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC. As discussed herein, the terms memory, storage, storage device, and storage media, or other equivalent terms, may be interchangeable and may refer to any non-transitory storage or media to store data and/or instructions thereon, wherein the instructions may be executed by another device such as a processor or baseband processor, or logic devices or circuits, and the scope of the claimed subject matter is not limited in these respects.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry

804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect. In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage-controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
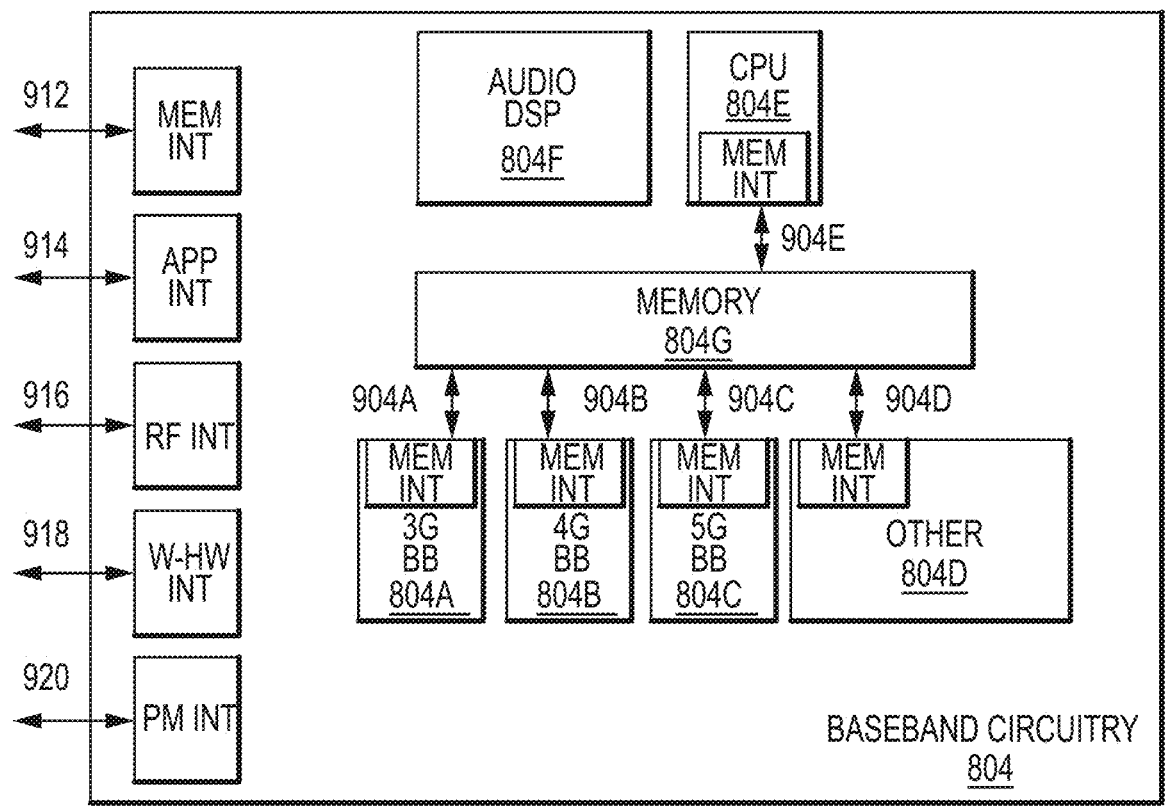
FIG. 9 illustrates example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Although the claimed subject matter has been described with a certain degree of particularity, it should be recognized that elements thereof may be altered by persons skilled in the art without departing from the spirit and/or scope of claimed subject matter. It is believed that the subject matter pertaining to simultaneous HARQ-ACK feedback and uplink transmission without dynamic grant and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
one or more baseband processors to process instructions received from a New Radio (NR) NodeB (gNB) to indicate i) a scheduling of a first uplink (UL) transmission or ii) a transmission opportunity for the first UL transmission, wherein the one or more baseband processors are further configured to process a dynamic indication to interrupt the first UL transmission and wherein a reference uplink resource (RUR) is defined and a time offset between the dynamic indication is received and the RUR accommodates an application time limited by the minimum UE processing time for PUSCH preparation supported by the UE, $T_{proc,2}$; and
radio frequency circuitry (RF) configured to transmit the first UL transmission.

2. The apparatus of claim 1, wherein the first UL transmission is one of:
a dynamically scheduled physical uplink shared channel (PUSCH);
a dynamically scheduled physical uplink control channel (PUCCH) carrying downlink (DL) HARQ-ACK feedback;
a transmission opportunity for a configured grant (CG) PUSCH; a transmission opportunity for PUCCH carrying uplink control information including scheduling request (SR) or channel state information (CSI) feedback;
a transmission opportunity for sounding reference signal (SRS); or
a transmission opportunity for a physical random access channel (PRACH); and
wherein the dynamic indication is carried by a UE-specific downlink control information (DCI) format.

3. The apparatus of claim 2, wherein the first UL transmission is a dynamically scheduled PUSCH and the one or more baseband processors are to cancel the dynamically scheduled PUSCH transmission in response to the dynamic indication, wherein the dynamic indication is carried by a second DCI grant, that is received after the reception of a first DCI grant scheduling the first UL transmission, and that schedules another PUSCH transmission to start before the ending symbol of the first UL transmission.

4. The apparatus of claim 3, wherein repetitions of the previously scheduled PUSCH are dropped when the second DCI grant schedules a same hybrid automatic repeat request (HARQ) process or another HARQ process.

5. The apparatus of claim 3, wherein repetitions of the previously scheduled PUSCH, that do not overlap in time domain with the PUSCH with a different HARQ process that is scheduled by the second DCI grant, are not dropped.

6. The apparatus of claim 3, wherein the second DCI grant is indicated to have a higher priority compared to the previously scheduled PUSCH.

7. The apparatus of claim 1, wherein the dynamic indication is carried by DCI Format 2_1 with the cyclic redundancy check (CRC) scrambled with a radio network temporary identifier (RNTI).

8. The apparatus of claim 1, wherein the application time is configured semi-statically by radio resource control (RRC) signaling.

9. The apparatus of claim 1, wherein the dynamic indication comprises an interruption indication or a continuation indication.

10. The apparatus of claim 9, wherein the interruption indication or the continuation indication is applicable only for uplink transmissions with repetitions.

11. The apparatus of claim 9, wherein the interruption indication or the continuation indication is applicable only for UL transmissions spanning a certain number of minimum duration or a number of symbols for a given subcarrier spacing.

12. The apparatus of claim 9, wherein the one or more baseband processors are to monitor for the interruption indication only when the one or more baseband processors are configured for PUSCH transmissions with an aggregation factor greater than one for dynamically scheduled PUSCH transmission or for configured grant PUSCH transmissions.

13. The apparatus of claim 1, wherein scheduled PUSCH transmission is interrupted based on puncturing or rate-matching to avoid transmission on interrupted resources.

14. One or more non-transitory storage media having instructions stored thereon that, when executed by an apparatus of a user equipment (UE), result in:
processing instructions received from a New Radio (NR) NodeB (gNB) to indicate i) a scheduling of a first uplink (UL) transmission or ii) a transmission opportunity for the first UL transmission; and
processing a dynamic indication to interrupt the first UL transmission, wherein a reference uplink resource (RUR) is defined and a time offset between the dynamic indication is received and the RUR accommodates an application time limited by the minimum UE processing time for PUSCH preparation supported by the UE, $T_{proc,2}$.

15. The one or more non-transitory storage media of claim 14, wherein the first UL transmission is one of:
a dynamically scheduled physical uplink shared channel (PUSCH);
a dynamically scheduled physical uplink control channel (PUCCH) carrying downlink (DL) HARQ-ACK feedback;
a transmission opportunity for a configured grant (CG) PUSCH;
a transmission opportunity for PUCCH carrying uplink control information including scheduling request (SR) or channel state information (CSI) feedback;
a transmission opportunity for sounding reference signal (SRS); or
a transmission opportunity for a physical random access channel (PRACH);
wherein the dynamic indication is carried by a UE-specific DCI format.

16. The one or more non-transitory storage media of claim 15, wherein the first UL transmission is a dynamically scheduled PUSCH and the one or more baseband processors are to cancel the dynamically scheduled PUSCH transmission in response to the dynamic indication, wherein the dynamic indication is to be carried by a second DCI grant, that is received after the reception of a first DCI grant scheduling the first UL transmission, and that schedules another PUSCH transmission to start before the ending symbol of the first UL transmission.

17. The one or more non-transitory storage media of claim 16, wherein repetitions of the previously scheduled PUSCH are to be dropped when the second DCI grant schedules a same hybrid automatic repeat request (HARQ) process or another HARQ process.

18. The one or more non-transitory storage media of claim 16, wherein repetitions of the previously scheduled PUSCH, that do not overlap in time domain with the PUSCH with a different HARQ process that is scheduled by the second DCI grant, are not to be dropped.

* * * * *

UNITED STATES PATENT AND TRADEMARK OFFICE
CERTIFICATE OF CORRECTION

Page 1 of 1

PATENT NO. : 11,039,464 B2
APPLICATION NO. : 16/274953
DATED : June 15, 2021
INVENTOR(S) : Xiong et al.

It is certified that error appears in the above-identified patent and that said Letters Patent is hereby corrected as shown below:

On the Title Page

Related U.S. Application Data section should read as follows:
"(60) Provisional application No. 62/631,317, filed on Feb. 15, 2018, provisional application No. 62/710,317, filed Feb. 16, 2018".

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*